(12) United States Patent
Ma et al.

(10) Patent No.: US 11,326,728 B2
(45) Date of Patent: May 10, 2022

(54) CONNECTOR ASSEMBLY

(71) Applicant: ILLINOIS TOOL WORKS INC., Glenview, IL (US)

(72) Inventors: Yue Ma, Shanghai (CN); Jielei Shi, Shanghai (CN); Ziteng Zheng, Shanghai (CN)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 17/154,423

(22) Filed: Jan. 21, 2021

(65) Prior Publication Data

US 2021/0222810 A1   Jul. 22, 2021

(30) Foreign Application Priority Data

Jan. 22, 2020  (CN) .......................... 202010074701.5
Dec. 25, 2020  (CN) .......................... 202011564356.X

(51) Int. Cl.
| | | |
|---|---|---|
| *F16L 37/32* | (2006.01) | |
| *F16L 37/252* | (2006.01) | |
| *F16L 29/04* | (2006.01) | |
| *F16L 37/22* | (2006.01) | |
| *F16L 37/36* | (2006.01) | |

(52) U.S. Cl.
CPC ............... *F16L 37/32* (2013.01); *F16L 29/04* (2013.01); *F16L 37/252* (2013.01); *F16L 37/22* (2013.01); *F16L 37/36* (2013.01)

(58) Field of Classification Search
CPC . F16L 29/04; F16L 37/30; F16L 37/32; F16L 37/36; F16L 37/252; F16L 37/244; F16L 37/24; F16L 37/248
See application file for complete search history.

(56) References Cited

U.S. PATENT DOCUMENTS

| | | | | | |
|---|---|---|---|---|---|
| 1,345,571 | A | * | 7/1920 | Yates ....................... | F16L 29/04 137/614.04 |
| 2,304,390 | A | * | 12/1942 | Wolfram .................. | F16L 29/04 137/614.03 |
| 2,319,015 | A | * | 5/1943 | Speth ....................... | F16L 29/04 137/614.03 |
| 3,213,884 | A | * | 10/1965 | Moyer .................... | F16L 37/32 137/614.03 |

(Continued)

FOREIGN PATENT DOCUMENTS

DE       1551641 A1  *  3/1970  .............. F16L 37/33

*Primary Examiner* — David Colon-Morales
(74) *Attorney, Agent, or Firm* — Quarles & Brady LLP

(57) ABSTRACT

A connector assembly includes a male connector and a female connector. The male connector comprises a male connector housing, a male connector valve core, and a male connector push rod. The female connector comprises a female connector housing, a female connector valve core, and a female connector push rod. The male connector valve core has a closed position, the female connector valve core has a closed position, and the male connector is capable of being at least partially inserted into the female connector. When the male connector is inserted to a proper place in the female connector, the male connector push rod pushes the female connector valve core away from the closed position, and the female connector push rod pushes the male connector valve core away from the closed position, so that the male connector fluidly communicates with the female connector.

20 Claims, 12 Drawing Sheets

(56) References Cited

U.S. PATENT DOCUMENTS

| | | | | | |
|---|---|---|---|---|---|
| 3,289,699 | A | * | 12/1966 | Westveer | F16L 37/113 |
| | | | | | 137/614.03 |
| 3,446,245 | A | * | 5/1969 | Snyder, Jr. | F16L 37/32 |
| | | | | | 137/614.03 |
| 4,447,040 | A | * | 5/1984 | Magorien | F16L 37/32 |
| | | | | | 137/508 |
| 4,942,901 | A | * | 7/1990 | Vescovini | F16L 37/32 |
| | | | | | 137/614.06 |
| 6,354,564 | B1 | * | 3/2002 | Van Scyoc | F16L 37/32 |
| | | | | | 137/614.04 |
| 6,637,725 | B2 | * | 10/2003 | Davis | B67D 1/0835 |
| | | | | | 137/269 |
| 6,964,406 | B2 | * | 11/2005 | Doyle | A61M 39/045 |
| | | | | | 251/149.3 |
| 7,401,626 | B1 | * | 7/2008 | Plattner | F16L 37/107 |
| | | | | | 137/614.03 |
| 9,708,173 | B2 | * | 7/2017 | Ballard | F16L 37/30 |
| 10,704,725 | B2 | * | 7/2020 | Takezawa | F16L 39/02 |
| 10,865,916 | B2 | * | 12/2020 | Tivelli | F16L 29/04 |
| 10,865,929 | B2 | * | 12/2020 | Tarissan | F16L 29/007 |

* cited by examiner

CONNECTOR ASSEMBLY

CROSS REFERENCES TO RELATED APPLICATIONS

This application claims priority to Chinese Application Serial Nos. 202010074701.5 and 202011564356.X, respectively filed Jan. 22, 2020 and Dec. 25, 2020, the contents of which are incorporated herein by reference in their entirety.

TECHNICAL FIELD

The present disclosure relates to a connector (or connection) assembly, and in particular, to a connector assembly for communicating fluid.

BACKGROUND

In some applications, fluid is accommodated in both a first component and a second component which can be communicated to each other. When the first component is separated from the second component, it is necessary to ensure that the first component and the second component are in a sealed state, and the fluid inside the components cannot leak to the outside of the components. When the first component is connected to the second component, it is necessary to fluidly communicate the first component with the second component, so that the fluid can flow between the first component and the second component. To facilitate fluid communication between the first component and the second component, a male connector and a female connector which can match each other is respectively disposed on the first component and the second component. When the first component is connected to the second component, the fluid communication is implemented through the male connector and the female connector; and when the first component is separated from the second component, the fluid in the first component and the fluid in the second component are respectively sealed by the male connector and the female connector and cannot flow to the outside of the components.

SUMMARY

The present disclosure provides a connector assembly, which is configured to communicate or block a fluid passage and comprises a male connector and a female connector. The male connector comprises a male connector housing, a male connector valve core, and a male connector push rod. The male connector housing is internally provided with a male connector fluid passage and comprises an insertion end. The male connector valve core is movably disposed in the male connector fluid passage, and the male connector push rod is connected to the male connector housing. The female connector comprises a female connector housing, a female connector valve core, and a female connector push rod. The female connector housing is internally provided with a female connector fluid passage and comprises a receiving end, the female connector valve core is movably disposed in the female connector fluid passage, and the female connector push rod is connected to the female connector housing. The insertion end of the male connector is capable of being inserted into the receiving end of the female connector. The male connector push rod is capable of being inserted into the female connector housing from the receiving end of the female connector to push the female connector valve core, and the female connector push rod is capable of being inserted into the male connector housing from the insertion end of the male connector to push the male connector valve core.

According to the above connector assembly, the male connector push rod extends out of the insertion end of the male connector, and the female connector push rod is at least partially accommodated in the female connector housing.

According to the above connector assembly, the male connector valve core has a closed position. When the male connector valve core is in the closed position, the male connector fluid passage is closed, and when the male connector valve core leaves the closed position, the male connector fluid passage is opened. The female connector valve core also has a closed position. When the female connector valve core is in the closed position, the female connector fluid passage is closed, and when the female connector valve core leaves the closed position, the female connector fluid passage is opened. When the insertion end of the male connector is inserted in the receiving end of the female connector to a proper position, the male connector push rod pushes the female connector valve core away from the closed position, so as to open the female connector fluid passage, and the female connector push rod pushes the male connector valve core away from the closed position, so as to open the male connector fluid passage, so that the male connector fluidly communicates with the female connector.

According to the above connector assembly, the male connector further comprises a male connector elastic device. The male connector elastic device is disposed between the male connector valve core and the male connector housing, and the male connector elastic device is configured to provide an elastic force to the male connector valve core such that the male connector valve core is capable of reaching the closed position. The female connector further comprises a female connector elastic device. The female connector elastic device is disposed between the female connector valve core and the female connector housing, and the female connector elastic device is configured to provide an elastic force to the female connector valve core such that the female connector valve core is capable of reaching the closed position.

According to the above connector assembly, the male connector valve core has a slope surface for sealing, and an inner wall of the male connector housing is provided with a slope surface for engaging that engages with the slope surface for sealing. The female connector valve core has a slope surface for sealing, and an inner wall of the female connector housing is provided with a slope surface for engaging that engages with the slope surface for sealing.

According to the above connector assembly, the male connector push rod and the male connector housing are integrally formed, and the female connector push rod and the female connector housing are integrally formed.

According to the above connector assembly, the male connector push rod comprises a first supporting portion and a first rod portion. The first supporting portion is connected to an inner wall of the male connector housing, and the first rod portion extends from the first supporting portion in an axial direction of the male connector. The female connector push rod comprises a second supporting portion and a second rod portion. The second supporting portion is connected to an inner wall of the female connector housing, and the second rod portion extends from the second supporting portion in an axial direction of the female connector. The first rod portion and the second rod portion are arranged in a staggered manner in a radial direction of the connector assembly.

According to the above connector assembly, the first supporting portion has a male connector hole, and the male connector hole is configured to allow the female connector push rod to pass through. The female connector has a female connector hole penetrating the second supporting portion in the axial direction, and the female connector hole is configured to allow the male connector push rod to pass through.

According to the above connector assembly, the male connector push rod comprises at least two first rod portions, and the at least two first rod portions are uniformly distributed around the male connector hole.

According to the above connector assembly, the male connector valve core comprises a recessed portion formed by recessing inward from a surface at distal end of the male connector push rod, and the recessed portion is configured to match the shape of a distal end of the female connector push rod, so as to be capable of accommodating the distal end of the female connector push rod. The female connector valve core comprises a pin portion, the female connector push rod comprises a groove, and the pin portion is at least partially accommodated in the groove and is movable in the groove.

The connector assembly provided in the present disclosure has a simple structure and fewer components, is mainly made of plastic materials, and is easy to manufacture. The connector assembly provided in the present disclosure is convenient to operate and is easy to plug or unplug.

BRIEF DESCRIPTION THE DRAWINGS

DETAILED DESCRIPTION

Various specific embodiments of the present invention are described below with reference to the accompanying drawings which constitute part of this description. It should be understood that although the terms such as "front", "rear", "upper", "lower", "left", and "right" indicating directions in the present disclosure are used to describe various exemplary structural parts and elements in the present disclosure, these terms used herein are merely used for ease of description and are determined based on the exemplary orientation shown in the accompanying drawings. Since the embodiments disclosed in the present disclosure can be arranged in different directions, these terms indicating directions are only illustrative and should not be considered as limitations.

Figure 1A:
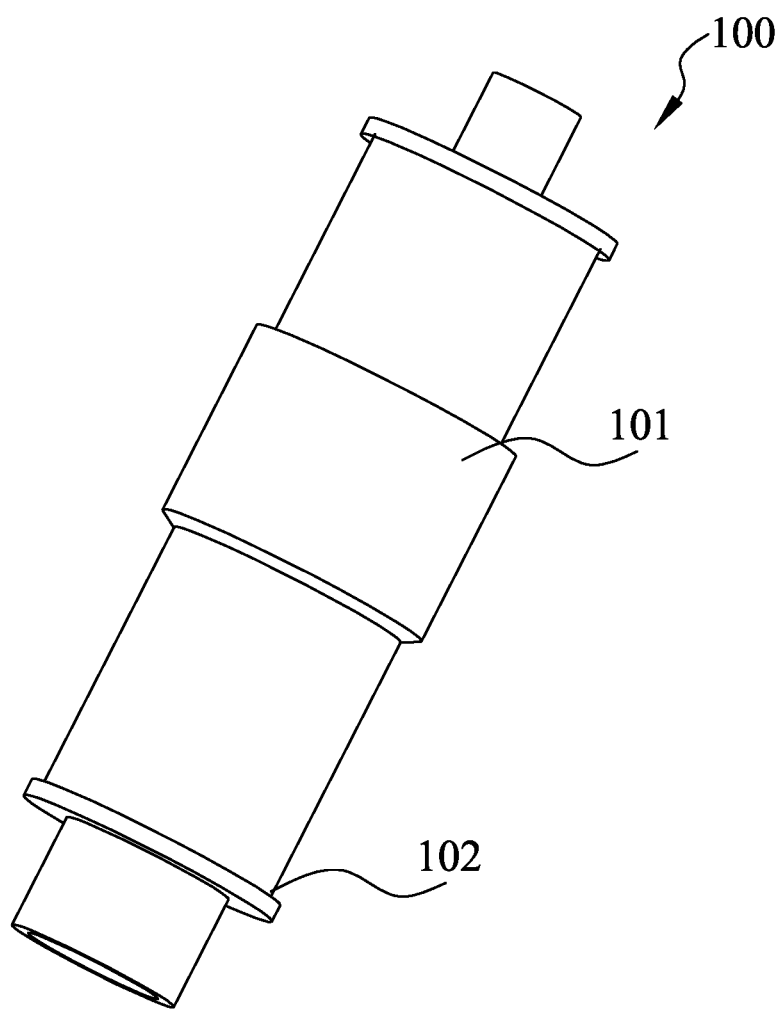
FIG. 1A is a perspective view of an embodiment of a connector assembly according to the present disclosure.
Figure 1B:
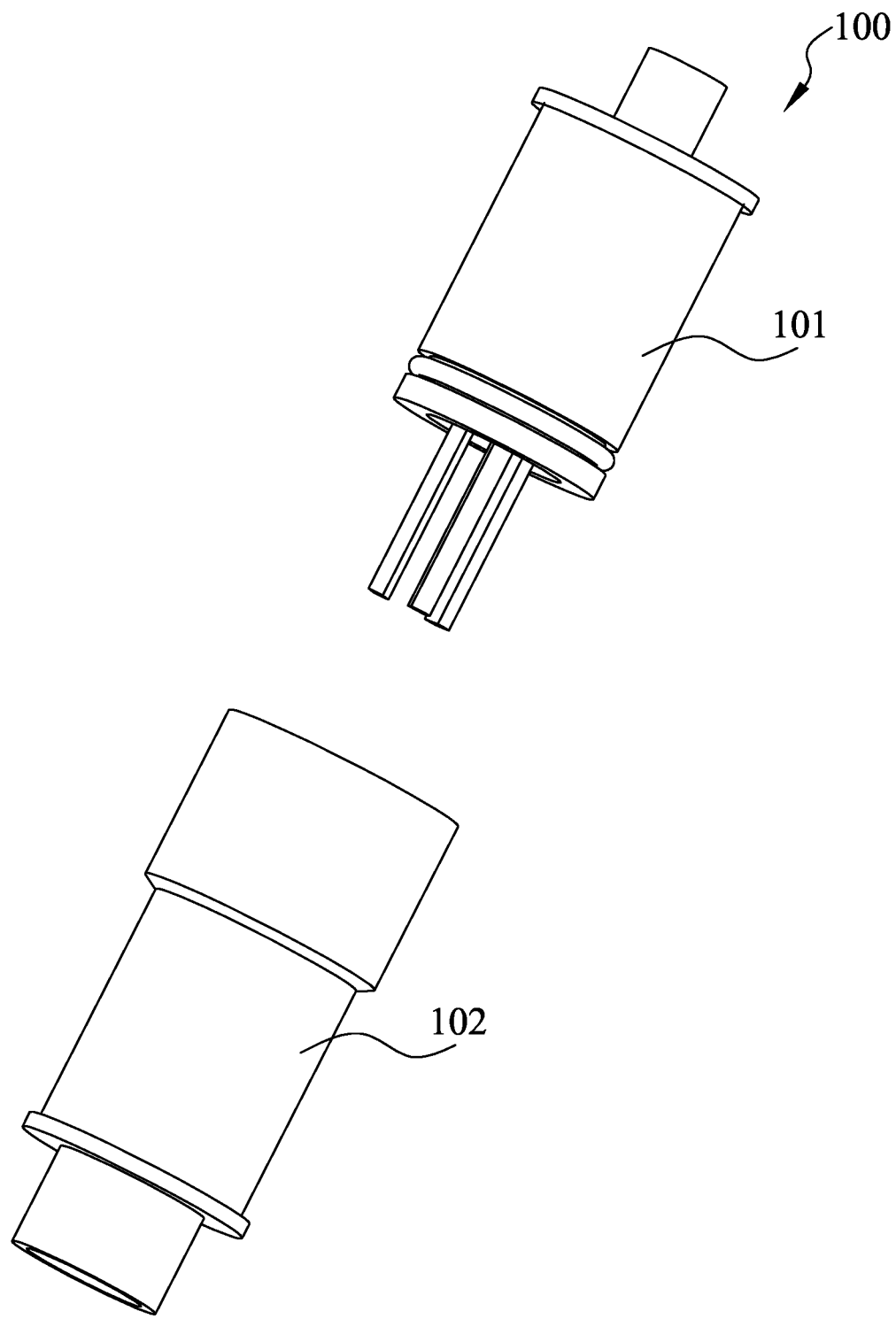
FIG. 1B is a partial exploded view of the connector assembly in FIG. 1A.

FIG. 1A is a perspective view of an embodiment of a connector assembly 100 according to the present disclosure, and FIG. 1B is an exploded view of the connector assembly 100 in FIG. 1A, for showing the structure of the connector assembly 100. As shown in FIGS. 1A and 1B, the connector assembly 100 comprises a male connector 101 and a female connector 102, wherein one end of the male connector 101 can be inserted into the female connector 102, and the other end thereof is configured to be coupled to a component or a first component (not shown in the figures); and one end of the female connector 102 can accommodate the insertion end of the male connector 101, and the other end thereof is configured to be connected to another component or a second component (not shown in the figures). The male connector 101 and the female connector 102 match each other to controllably communicate or block a fluid passage between the first component and the second component. When the male connector 101 is separated from the female connector 102, fluid in the first component and fluid in the second component are respectively blocked by the male connector 101 and the female connector 102 and cannot flow to the outside; when the male connector 101 is inserted to a proper position in the female connector 102, the first component fluidly communicates with the second component by means of the male connector 101 and the female connector 102.

Figure 2:
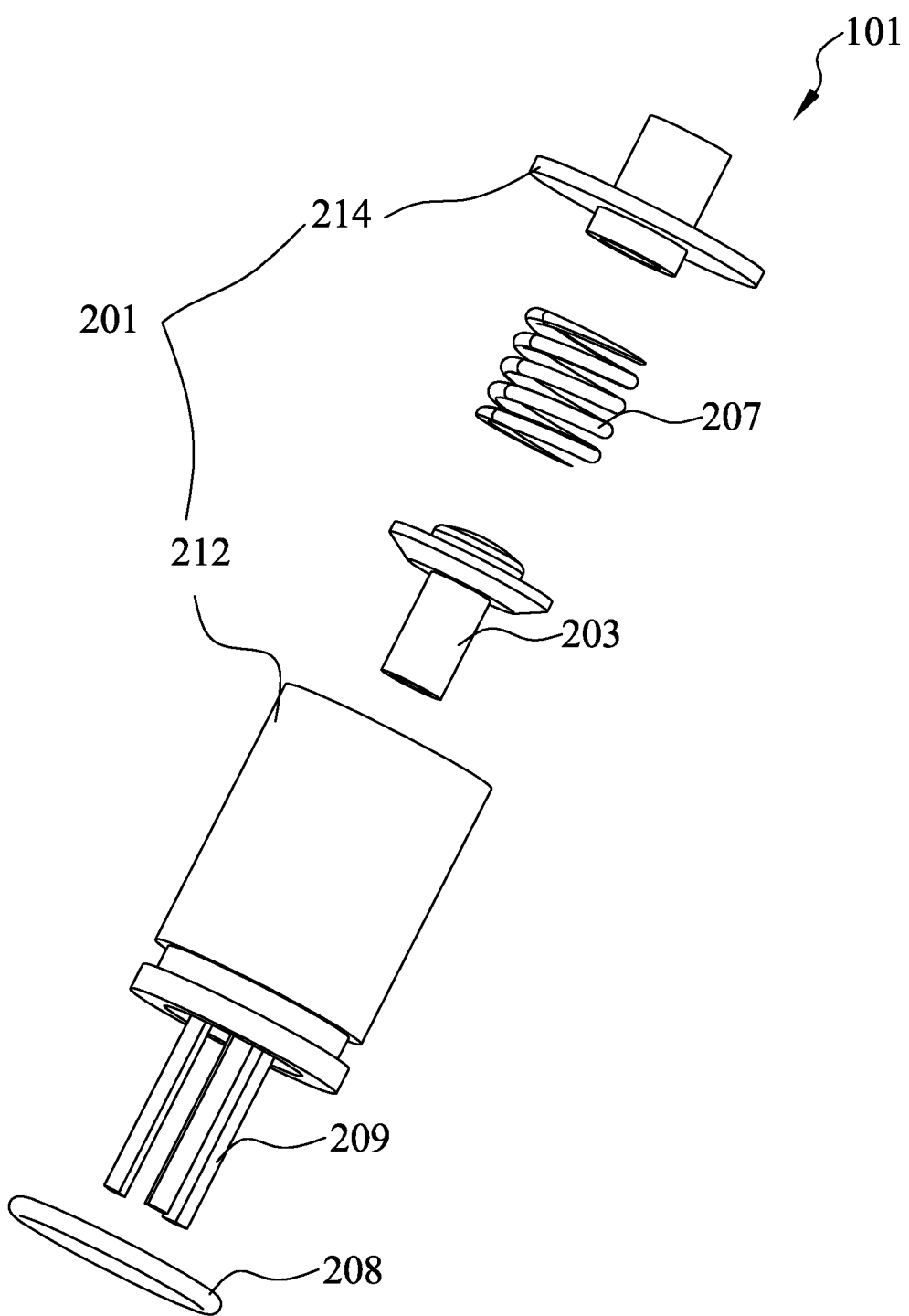
FIG. 2 is an exploded view of a male connector in FIG. 1A.

FIG. 2 is an exploded view of the male connector 101 in FIG. 1A, showing components included in the male connector 101. As shown in FIG. 2, the male connector 101 comprises a male connector housing 201, a male connector elastic device 207, a male connector valve core 203, a male connector push rod 209, and a seal 208. The male connector elastic device 207 and the male connector valve core 203 are disposed inside the male connector housing 201, the seal 208 is jacketed on the housing 201, and the male connector push rod 209 is connected to the male connector housing 201. The male connector housing 201 comprises a main body 212 and a cover portion 214, and the main body 212 is substantially cylindrical. When the male connector 101 is being assembled, the male connector elastic device 207 and the male connector valve core 203 are firstly assembled into the main body 212, and then the cover portion 214 is connected to the main body 212, so that the male connector elastic device 207 and the male connector valve core 203 are located in the male connector housing 201. The male connector housing 201 and the male connector push rod 209 are made of plastic materials, such as PA66-GF30, or PPA, PPS materials. The seal 208 is made of an elastic material, such as rubber.

Figure 3A:
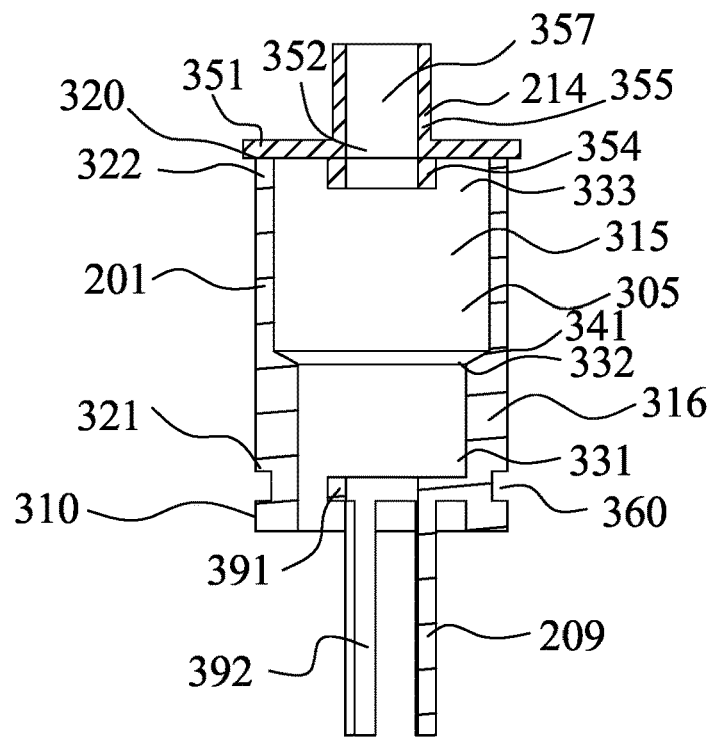
FIG. 3A is an axial cross-sectional view of a male connector housing and a male connector push rod in FIG. 2.
Figure 3B:
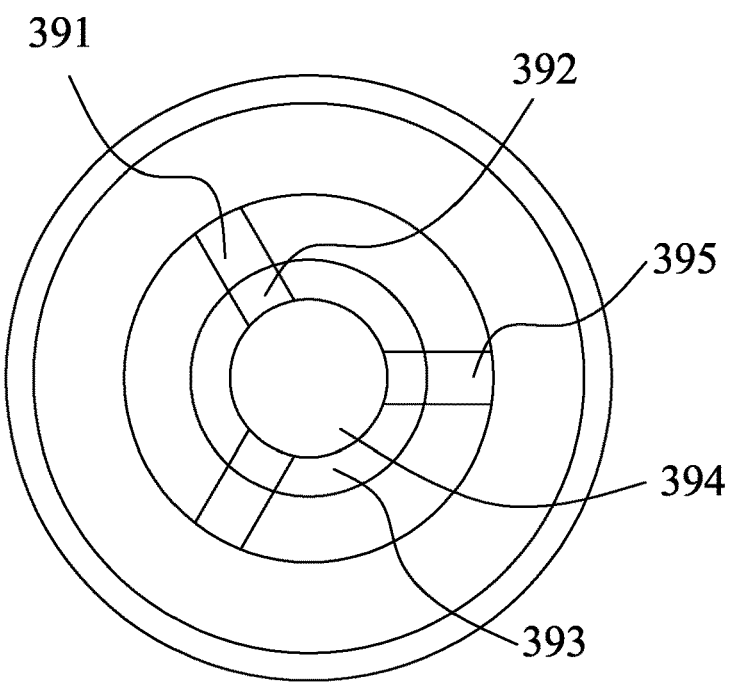
FIG. 3B is a bottom view of a main body of the male connector housing and the male connector push rod in FIG. 3A.

FIG. 3A is an axial cross-sectional view of the male connector housing 201 and the male connector push rod 209 in FIG. 2, and FIG. 3B is a bottom view of the male connector housing 201 and the male connector push rod 209 in FIG. 3A, showing the structures of the male connector housing 201 and the male connector push rod 209. As shown in FIGS. 3A and 3B, the male connector housing 201 has an insertion end 310 and a first coupling end 320. The first coupling end 320 is configured to be coupled to the first component, and the insertion end 310 is configured to match the female connector 102.

The cover portion 214 of the male connector housing 201 is disposed at the first coupling end 320, and the male connector push rod 209 is connected to the insertion end 310 and extends in a direction away from the cover portion 214. As an example, the male connector push rod 209 and the main body 212 of the male connector housing 201 are integrally formed. The main body 212 of the male connector housing 201 and the cover portion 214 of the male connector housing 201 are separated components before the assembly of the male connector 101 is completed.

The main body 212 of the male connector housing 201 comprises a cylindrical side wall 316 and a cavity 315 surrounded by the side wall 316. The cavity 315 forms a male connector fluid passage 305. The main body 212 has a front end 321 and a rear end 322, the front end 321 constitutes the insertion end 310, and the rear end 322 and the cover portion 214 connected to the rear end 322 together constitute the first coupling end 320. The main body 212 comprises a front section 331, a middle section 332 and a rear section 333, wherein the front section 331 is close to the front end 321 of the main body 212, and the rear section 333 is close to the rear end 322 of the rear main body 212. The inner diameter of the front section 331 is smaller than the inner diameter the rear section 333. Two ends of the middle section 332 are respectively connected to the front section 331 and the rear section 333, so that an inner wall of the middle section 332 forms a tapered slope surface for engaging 341. The slope surface for engaging 341 gradually extends away from an axis of the male connector 101 in a direction from the insertion end 310 of the male connector 101 to the first coupling end 320. The slope surface for engaging 341 is configured to engage with the male connector valve core 203.

The male connector push rod 209 comprises a first supporting portion 391 and three first rod portions 392, and the first supporting portion 391 connects the three first rod portions 392 to the main body 212 of the male connector housing 201. The first supporting portion 391 comprises a supporting ring 393 and connecting legs 395. The connecting legs 395 extend outward from the outer periphery of the supporting ring 393 to an inner wall of the male connector housing 201, and are connected to an inner wall of the insertion end 310. The joints between the connecting legs 395 and the male connector housing 201 may be located at the inner wall of the insertion end 310 or at the inner wall of the male connector housing 201 above the insertion end 310. The supporting ring 393 has a male connector hole 394, which is configured to allow a female connector push rod to pass through. The male connector rod portions 392 extend from the supporting ring 393 in a direction away from the first coupling end 320 and exceed the insertion end 310. There are three male connector rod portions 392, and the three male connector rod portions 392 are uniformly distributed in a circumferential direction.

The cover portion 214 comprises a cover plate 351, and an inner flange 354 and an outer flange 355 respectively located on the inner and outer sides of the cover plate 351. The cover plate 351 has a hole 352, and the inner flange 354 and the outer flange 355 respectively extend around the hole 352, so that the inner flange 354, the hole 352, and the outer flange 355 form a cover portion passage 357. The cover portion passage 357 is in communication with the male connector fluid passage 305. The outer flange 355 facilitates the coupling between the male connector 101 and the first component, and the inner flange 354 facilitates the abutment of the male connector elastic device 207 against the cover plate 351.

The insertion end 310 has an annular sealing groove 360 formed by recessing inward from an outside surface of the main body 212 of the housing 201 and configured to accommodate the seal 208.

Figure 4:
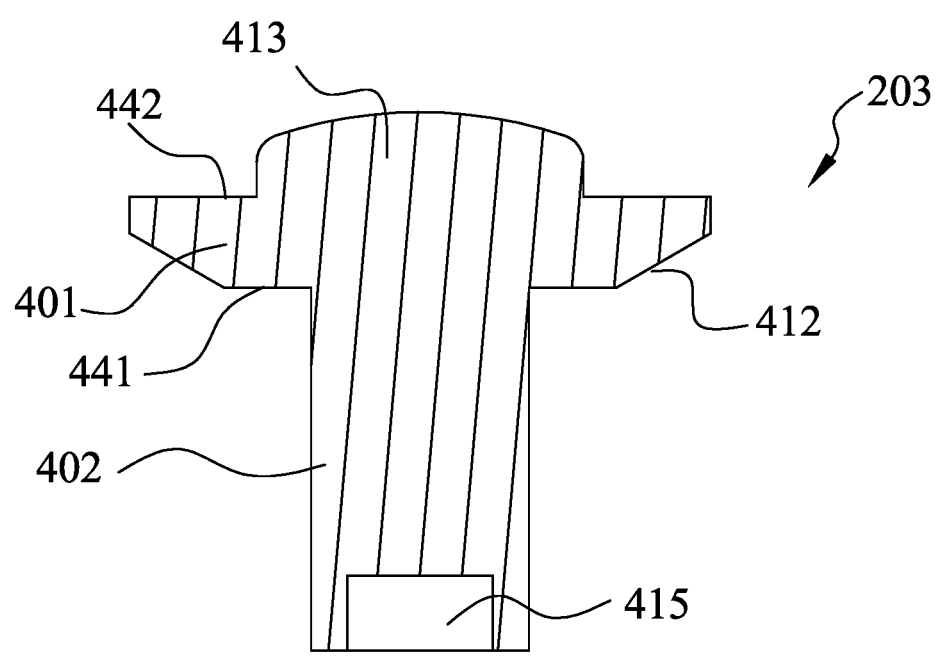
FIG. 4 is an axial cross-sectional view of a valve core in FIG. 2.

FIG. 4 is an axial cross-sectional view of the male connector valve core 203 of the male connector 101 in FIG. 2, showing the structure of the male connector valve core 203. As shown in FIG. 4, the male connector valve core 203 comprises a head 401 and a body 402, wherein the outer diameter of the head 401 is greater than the outer diameter of the body 402. A proximal end 441 of the head 401 is connected to the body 402, and a distal end 442 thereof is configured to be connected to the male connector elastic device 207. The proximal end 441 of the head 401 has a truncated cone shape, which forms a slope surface for sealing 412 configured for engaging with the slope surface for engaging 341. The slope surface for sealing 412 gradually extends away from an axis of the male connector valve core 203 in a direction from the proximal end 441 to the distal end 442 of the head. The distal end of the head 401 has a protrusion 413 configured for engaging with the male connector elastic device 207. A distal end of the body 402 has a recessed portion 415 formed by recessing inward, and the recessed portion 415 can partially accommodate a female connector push rod 709. In some embodiments, the male connector valve core 203 is made of a plastic material (such as PA66-GF30, or PPA, PPS materials) by integral molding process. In some other embodiments, the male connector valve core 203 is firstly made by a plastic material, and then a sealing layer is made of, by using a secondary molding process, an elastic material (such as rubber) at the position of the proximal end of the head 401 of the valve core 203 where the slope surface for sealing 412 is formed, and a surface of the sealing layer forms the slope surface for sealing 412, so that the slope surface for sealing 412 has a certain elasticity and can better engage with the slope surface for engaging 341.

Figure 5:
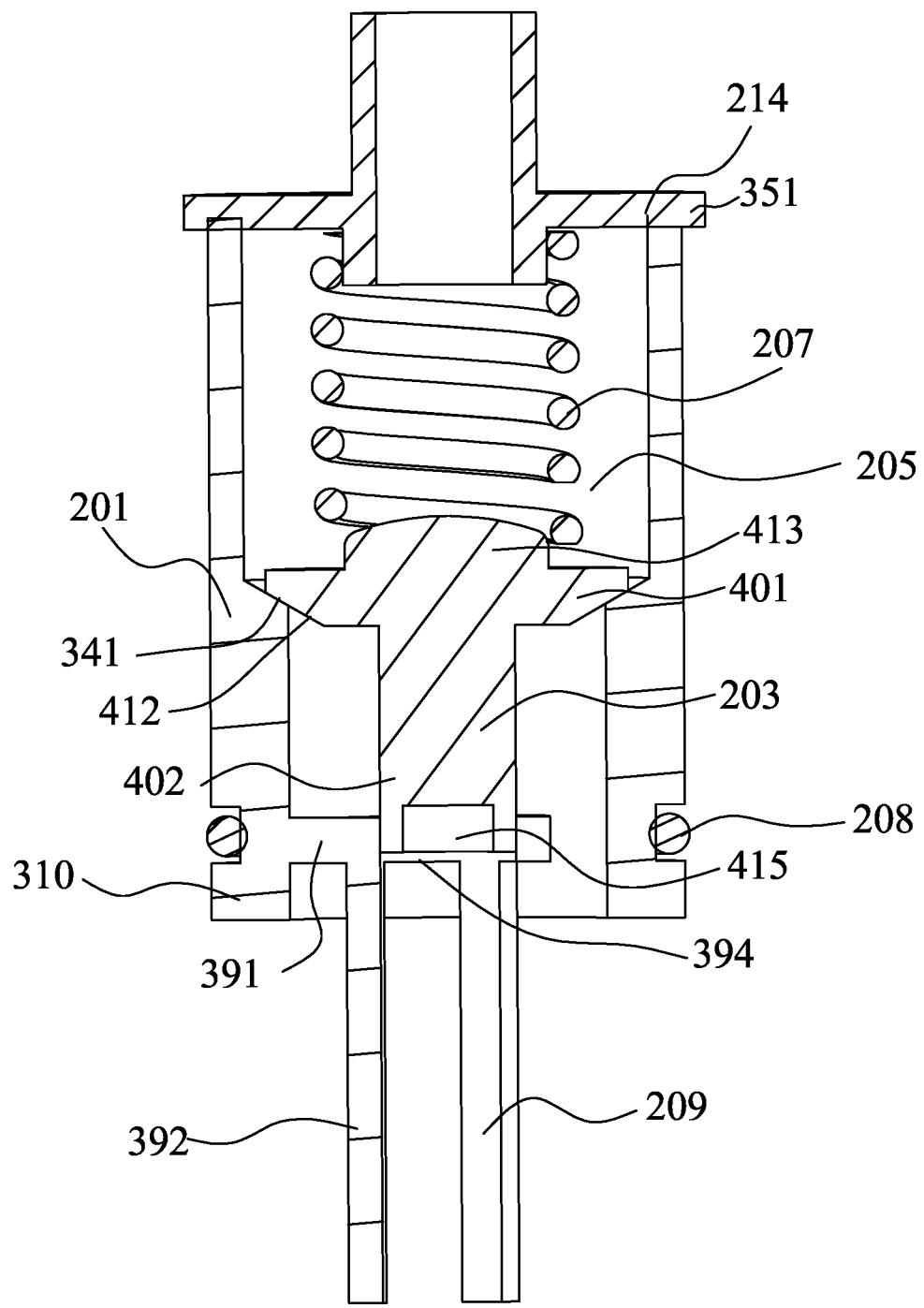
FIG. 5 is an axial cross-sectional view of the male connector in FIG. 1A.

FIG. 5 is an axial cross-sectional view of the male connector 101 in FIG. 1A, showing an engaging relationship between the components of the male connector 101 in a closed position. As shown in FIG. 5, the male connector elastic device 207 and the male connector valve core 203 are located in a cavity 315 of the housing 201, and one end of the male connector elastic device 207 is jacketed on the inner flange 354 and abuts against the inner side of the cover plate 351 of the cover portion 214. The other end of the male connector elastic device 207 is jacketed on the protrusion 413 of the valve core and abuts against the head 401 of the male connector valve core 203. The male connector elastic device 207 is compressed, such that the male connector valve core 203 is subjected to an elastic force of the male connector elastic device 207 and has a tendency to move in a direction away from the cover portion 214, so as to abut the slope surface for sealing 412 of the male connector valve core 203 against the slope surface for engaging 341 of the housing 201. At this time, the male connector 101 is in the closed position, and the male connector fluid passage 205 is closed by the male connector valve core 203. In the closed position of the male connector 101, the distal end of the body 402 of the male connector valve core 203 is at least partially accommodated in the male connector hole 394. The annular seal 208 is jacketed on the housing 201, and is at least partially located in the sealing groove 360 of the main body 212 of the housing 201.

Figure 6:
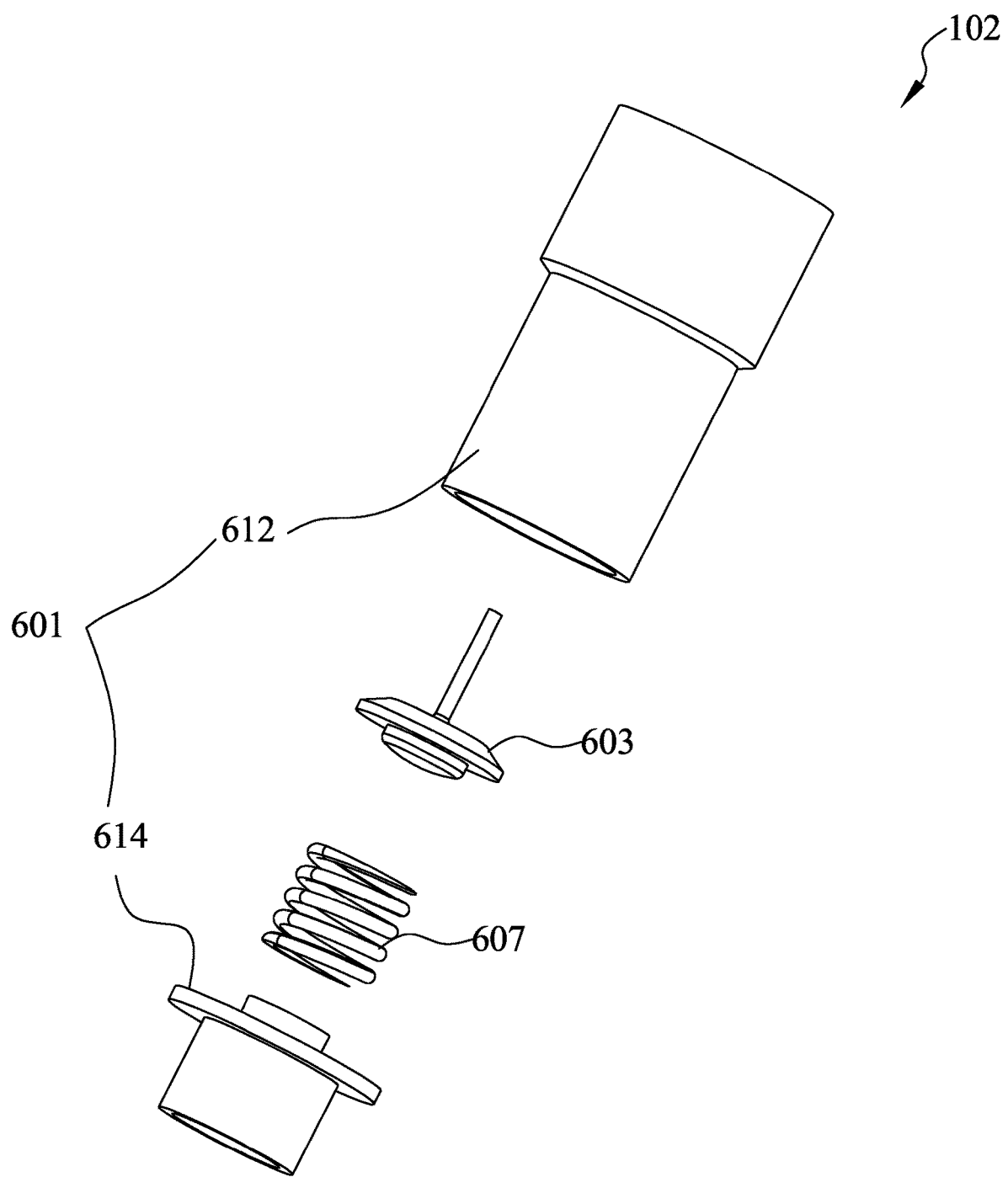
FIG. 6 is an exploded view of a female connector in FIG. 1A.

FIG. 6 is an exploded view of the female connector 102 in FIG. 1A, showing components included in the female connector 102. As shown in FIG. 6, the female connector 102 comprises a female connector housing 601, a female connector elastic device 607, a female connector valve core 603, and a female connector push rod 709 (see FIG. 7A). The female connector elastic device 607 and the female connector valve core 603 are disposed in the female connector housing 601, and the female connector push rod 709 is also disposed in the female connector housing 601, and is connected to the female connector housing 601. The female connector housing 601 comprises a main body 612 and a cover portion 614. When the female connector 102 is being assembled, the female connector elastic device 607 and the female connector valve core 603 are firstly assembled into the main body 612, and then the cover portion 614 is connected to the main body 612, so that the female connector elastic device 607 and the female connector valve core 603 are located in the female connector housing 601. The female connector housing 601 and the female connector push rod 709 are made of plastic materials, such as PA66-GF30 or PPA, PPS materials.

Figure 7A:
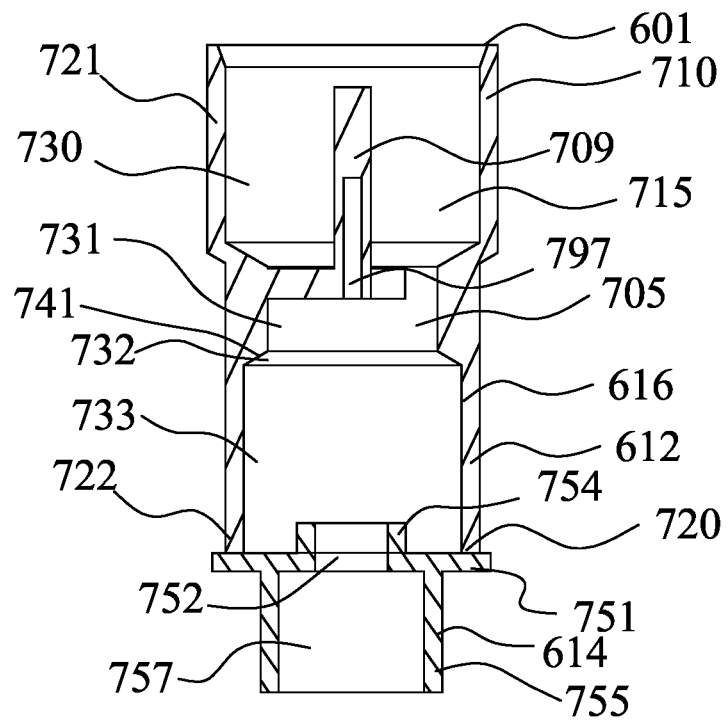
FIG. 7A is an axial cross-sectional view of a female connector housing and a female connector push rod in FIG. 6.
Figure 7B:
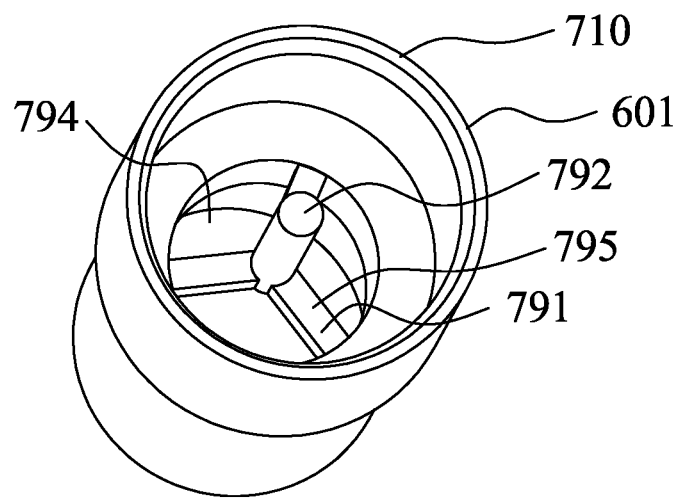
FIG. 7B is a perspective view of a main body of the female connector housing and the female connector push rod in FIG. 7A.

FIG. 7A is an axial cross-sectional view of the female connector housing 601 and the female connector push rod 709 in FIG. 6, and FIG. 7B is a perspective view of the main body of the female connector housing 601 and the female connector push rod 709 in FIG. 7A, showing the structures of the female connector housing 601 and the female connector push rod 709. As shown in FIGS. 7A and 7B, the female connector housing 601 has an approximately cylindrical outer contour, and has a receiving end 710 and a second coupling end 720. The second coupling end 720 is configured to be connected to the second component, and the receiving end 710 is configured to match the male connector 101.

The female connector housing 601 comprises a main body 612 and a cover portion 614, and the cover portion 614 is disposed at the second coupling end 720. The female connector push rod 709 is connected at the inner side of the main body 612 and extends toward the receiving end 710 and does not exceed the receiving end 710, so that the female connector push rod 709 is located inside the female connector housing 601. The female connector push rod 709 and the main body 612 are integrally formed. The main body 612 and the cover portion 614 are separated components before the assembly of the female connector.

The main body 612 comprises a cylindrical side wall 616 and a cavity 715 surrounded by the side wall 616. The cavity 715 forms a female connector fluid passage 705. The main body 612 has a front end 721 and a rear end 722, the front end 721 constitutes the receiving end 710, and the rear end 722 and the cover portion 614 connected to the rear end 722 jointly constitute the second coupling end 720. The main body 612 comprises an receiving section 730, a front section 731, a middle section 732, and a rear section 733, wherein the receiving section 730 is close to the receiving end 710, the front section 731 is connected to the receiving section 730, and the rear section 733 is close to the cover portion 614. The receiving section 730 is configured to accommodate the male connector 101. The inner diameter of the front section 731 is smaller than that of the rear section 733, and two ends of the middle section 732 are respectively connected to the front section 731 and the rear section 733 to form a slope surface for engaging 741. The slope surface for engaging 741 gradually approaches an axis of the female connector housing 601 in a direction from the receiving end 710 to the second coupling end 720. The slope surface for engaging 741 is configured to engage with the female connector valve core 603.

The female connector push rod 709 comprises a second supporting portion 791 and a second rod portion 792, and the second supporting portion 791 is configured to connect the second rod portion 792 to the female connector housing 601. The second supporting portion 791 comprises three connecting legs 795. The three connecting legs 795 extend outward from the outer periphery of one end of the rod portion 792 to an inner wall of the female connector housing 601, and are connected to an inner wall of the female connector housing 601. The joints between the three connecting legs 795 and the female connector housing 601 are located on an inner wall of the receiving section 730 and/or the front section 731 of the female connector housing 601. A female connector hole 794 is surrounded between adjacent connecting legs 795, the rod portion 792 and the inner wall of the female connector housing 601. The radial cross-sectional area of the female connector hole 794 is greater than that of the first rod portion 392, such that the male connector push rod 209 can pass through the female connector holes 794. Therefore, in the radial direction of the connector assembly, the first rod portions 392 are disposed around the second rod portion 792, that is, the first rod portions 392 and the second rod portion 792 are arranged in a staggered manner. The rod portion 792 of the female connector push rod extends from the second supporting portion 791 in a direction away from the second coupling end 720 to approach an end face of the receiving end 710, but does not exceed the end surface of the receiving end 710, that is, the whole female connector rod portion 792 is located inside the female connector housing 601. The outer diameter of the female connector rod portion 792 is smaller than the inner diameter of the male connector hole 394 so that the female connector rod portion 792 can pass through the male connector hole 394. The female connector rod portion 792 has a groove 797 formed by recessing toward the inside of the female connector rod portion 792 from an end face of the end of the female connector rod portion 792 close to the second supporting portion 791, and the groove 797 is configured to partially receive the female connector valve core 603.

In the embodiment shown in FIG. 7A, the female connector push rod 609 is located inside the female connector housing 601. In another embodiment of the present disclosure, the female connector push rod may extend out of the receiving end of the female connector housing.

The cover portion 614 comprises a cover plate 751, and an inner flange 754 and an outer flange 755 respectively located on the inner and outer sides of the cover plate 751. The cover plate 751 has a hole 752, and the inner flange 754 and the outer flange 755 respectively extend around the hole 752, so that the inner flange 754, the hole 752, and the outer flange 755 form a cover portion passage 757. The cover portion passage 757 is in communication with the female connector fluid passage 705. The outer flange 755 facilitates the connection between the female connector 102 and the second component, and the inner flange 754 facilitates the abutment of the female connector elastic device 607 against the cover plate 751.

Figure 8:
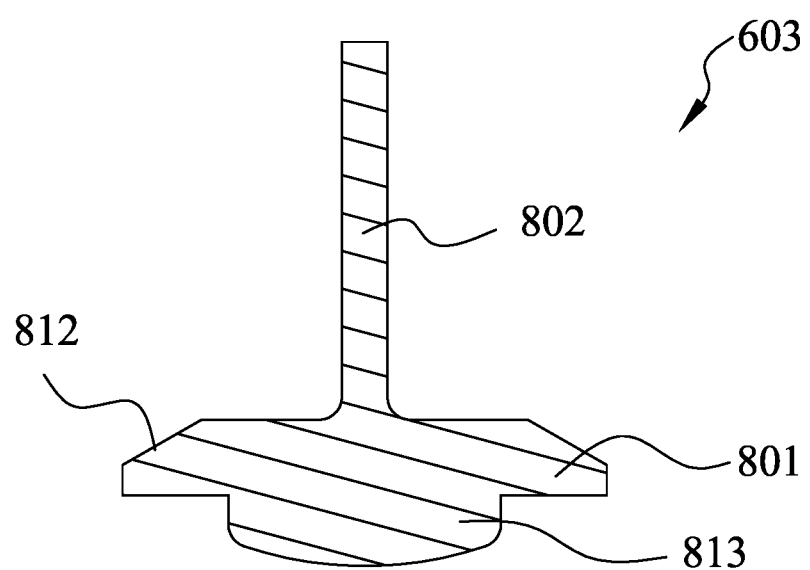
FIG. 8 is an axial cross-sectional view of a valve core in FIG. 6.

FIG. 8 is an axial cross-sectional view of the female connector valve core in FIG. 6, showing the structure of the female connector valve core 603. As shown in FIG. 8, the female connector valve core 603 comprises a head 801 and a pin portion 802, wherein the pin portion 802 is formed by extending outward from a proximal end of the head 801. The proximal end of the head 401 forms a truncated cone shape, thereby forming a slope surface for sealing 812 for engaging with the slope surface for engaging 741. The slope surface for sealing 812 gradually extends away from an axis of the female connector valve core 603 in a direction from the proximal end to a distal end of the head. In some embodiments, the whole female connector valve core 603 is made of a plastic material (such as PA66-GF30, or PPA, PPS materials) by integral molding process. In some other embodiments, the female connector valve core 603 is firstly made of a plastic material, and then a sealing layer is made of, by using a secondary molding process, an elastic material (such as rubber) at the position of the proximal end of the head 801 where the sealing surface 812 is formed, and a surface of the sealing layer is the slope surface for sealing 812, so that the slope surface for sealing 812 has a certain elasticity and can better engage with the slope surface for engaging 341. The distal end of the head 801 has a protrusion 813 protruding outwardly, which is configured to engage with the female connector elastic device 607. The shape of the pin portion 802 matches the shape of the groove 797 in the female connector rod portion 792, such that the pin portion 802 can be at least partially accommodated in the groove 797 and move in the groove 797.

Figure 9:
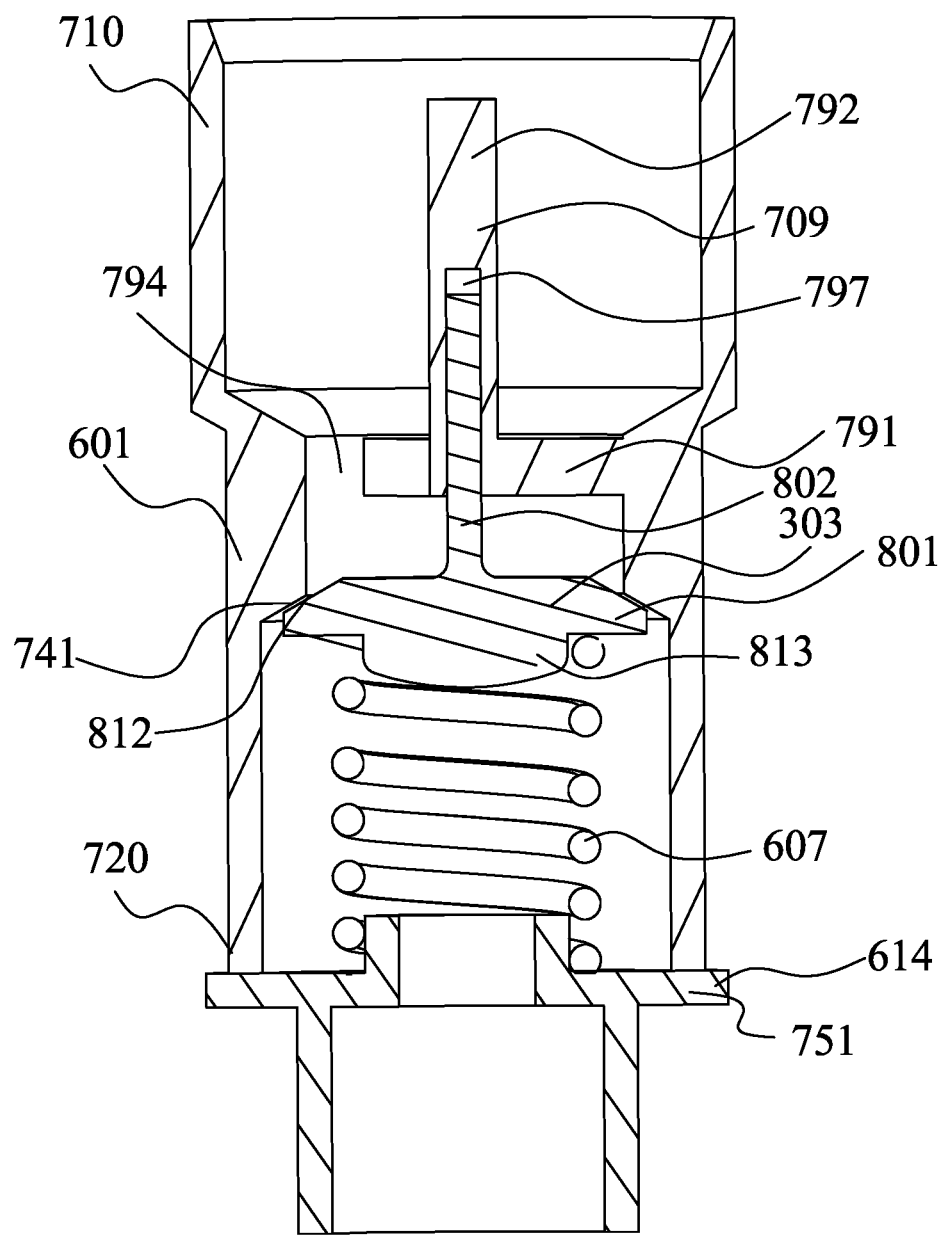
FIG. 9 is an axial cross-sectional view of the female connector in FIG. 1A.

FIG. 9 is an axial cross-sectional view of the female connector 102, showing an engaging relationship between the components of the female connector 102 in a closed position. As shown in FIG. 9, the female connector elastic device 607 and the female connector valve core 603 are disposed in the housing 601, and one end of the female connector elastic device 607 is jacketed on the inner flange 754 and abuts against the inner side of the cover plate 751 of the cover portion 614. The other end of the female connector elastic device 607 is jacketed on the protrusion 813 of the female connector valve core 603 and abuts against the head 801 of the female connector valve core 603. The female connector elastic device 607 is compressed, such that the female connector valve core 603 is subjected to an elastic force of the female connector elastic device 607 and has a tendency to move in a direction away from the cover portion 614, so as to abut the slope surface for sealing 812 of the female connector valve core 603 against the slope surface for engaging 741 of the housing 601. At this time, the female connector valve core 603 is in the closed position, and the female connector fluid passage 705 is closed. The pin portion 802 of the female connector valve core 603 is inserted into the groove 797, so that the female connector valve core 603 cannot move freely in the radial direction.

Figure 10C:
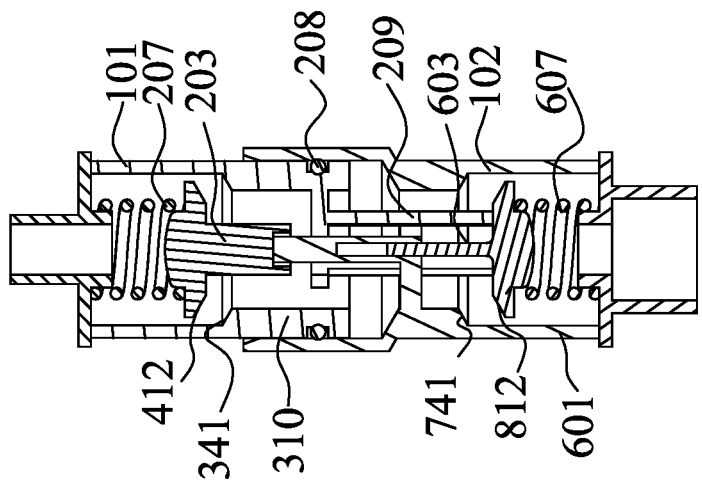
FIG. 10C is an axial cross-sectional view of the male connector inserted to a proper position in the female connector in FIG. 10A.
Figure 10B:
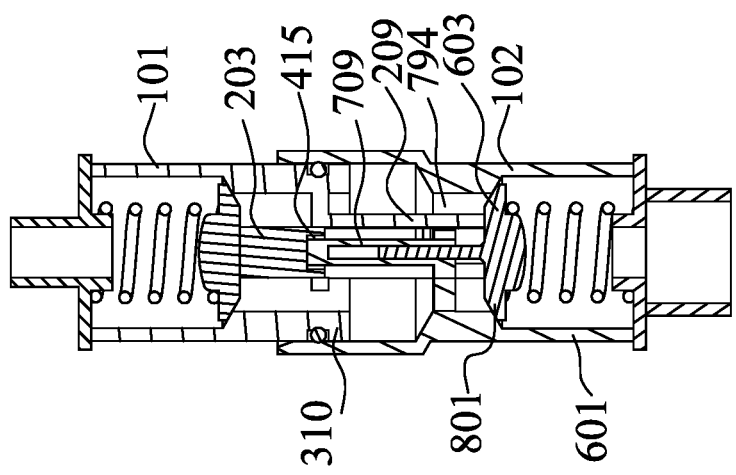
FIG. 10B is an axial cross-sectional view of the male connector partially inserted into the female connector in FIG. 10A.
Figure 10A:
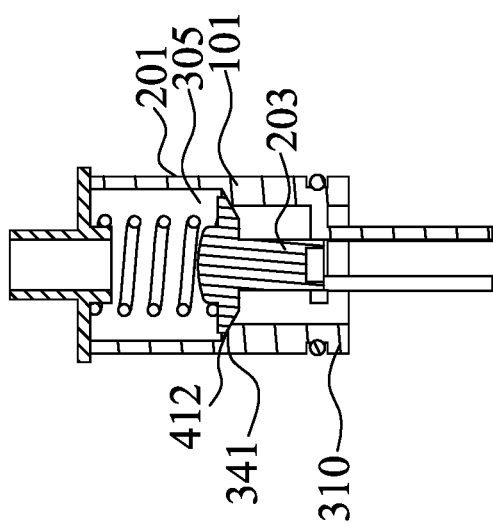
FIG. 10A is an axial cross-sectional view of the male connector and the female connector in FIG. 1A, wherein the male connector and the female connector are separated.
Figure 10A:
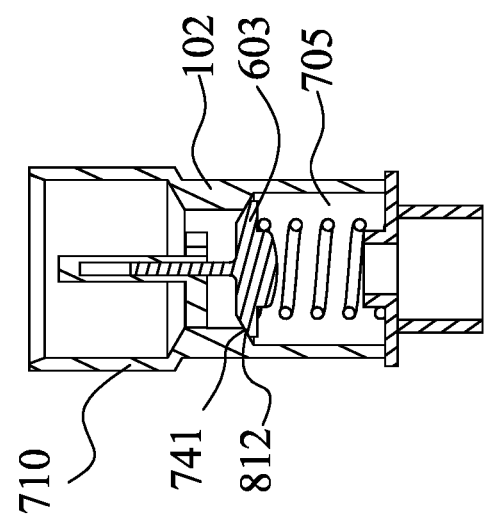

FIG. 10A is an axial cross-sectional view of the male connector 101 and the female connector 102, wherein the male connector and the female connector are separated, FIG. 10B is an axial cross-sectional view of the male connector partially inserted into the female connector, FIG. 10C is an axial cross-sectional view of the male connector inserted to a proper position in the female connector, and FIGS. 10A-10C show the process of inserting the male connector into the female connector.

As shown in FIGS. 10A-10C, when the male connector 101 is inserted into the female connector 102, as shown in FIG. 10A, the insertion end 310 is firstly aligned with the receiving end 710, and then the female connector 102 is moved toward the male connector 101, so that the insertion end 310 gradually enters the receiving end 710 until it reaches a pre-installation position as shown in FIG. 10B. Next, the female connector 102 is moved toward the male connector 101 and a pushing force is applied to the female connector 102, which makes the female connector 102 overcome the elastic forces of the male connector elastic device 207 and the female connector elastic device 607 and move to a working position as shown in FIG. 10C, so that the male connector fluid passage 305 and the female connector fluid passage 705 are opened, and the male connector 101 fluidly communicates with the female connector 102.

Specifically, as shown in FIG. 10A, when the male connector 101 and the female connector 102 are separated, the male connector valve core 203 is in the closed position, and the slope surface for sealing 412 of the male connector valve core 203 abuts against the slope surface for engaging 341 of the male connector housing 201, so that the fluid passage 305 is blocked by the valve core 203, and thus the fluid passage 305 is closed. The fluid in the first component connected to the male connector 101 is blocked by the valve core 203 and cannot reach the insertion end 310. Similarly, when the female connector valve core 603 is in the closed position, the slope surface for sealing 812 of the female connector valve core 603 abuts against the slope surface for engaging 741 of the female connector housing 601, so that the fluid passage 705 is blocked by the valve core 603, and thus the fluid passage 705 is closed. The fluid in the second component connected to the female connector 102 is blocked by the female connector valve core 603 and cannot reach the receiving end 710.

As shown in FIG. 10B, the male connector 101 is partially inserted into the female connector 102 to the pre-installation position. Since the male connector push rod 209 and the female connector push rod 709 are arranged in a staggered manner in the radial direction of the connector assembly, when the male connector 101 moves from the position shown in FIG. 10A to the pre-installation position, the male connector push rod 209 passes through the female connector holes 794 and comes into contact with the head 801 of the female connector valve core 603, and the distal end of the female connector push rod 709 enters the recessed portion 415 of the male connector valve core 203 and comes into contact with the bottom of the recessed portion 415. In the pre-installation position, although the insertion end 310 partially enters the receiving end 710, the male connector valve core 203 and the female connector valve core 603 are still in the closed position.

As shown in FIG. 10C, when the male connector 101 is inserted in the female connector 102 to reach the working position, the external force causes the male connector push rod 209 to overcome the elastic force of the female connector elastic device 607, and pushes the female connector valve core 603 to move downward to make the slope surface for sealing 812 disengage from the slope surface for engaging 741 of the female connector housing 601. At this time, the female connector fluid passage 705 is opened, the female connector 102 is in an open position, and fluid can flow through a space between the slope surface for sealing 812 and the slope surface for engaging 741. At the same time, the external force also causes the female connector push rod 709 to overcome the elastic force of the male connector elastic device 207, and pushes the male connector valve core 203 to move upward to make the slope surface for sealing 412 disengage from the slope surface for engaging 341 of the male connector housing 201. At this time, the male connector fluid passage 305 is opened, the male connector 101 is in the open position, and the fluid can flow through a space between the slope surface for sealing 412 and the slope surface for engaging 341. Since both the male connector fluid passage 305 and the female connector fluid passage 705 are opened, the first component connected to the male connector 101 and the second component connected to the female connector 102 fluidly communicate with each other through the male connector fluid passage 305 and the female connector fluid passage 705.

When it is necessary to separate the first component from the second component, the male connector 101 is pulled out of the female connector 102. The male connector valve core 203 and the female connector valve core 603 respectively return to their closed positions due to the action of the male connector elastic device 207 and the female connector elastic device 607 such that the fluid in the first component and the fluid in the second component will not leak into the external environment.

In the specific application of the connector assembly, there are two application environments. In the first application environment, after the first component and the second component are connected to each other via the connector assembly, their installation positions are limited by the installation environment and cannot be changed, and the male connector 101 and the female connector 102 are directly fixedly connected to the first component and the second component respectively, so that the male connector 101 and the female connector 102 are also limited in the working positions and cannot move relative to each other. In the first application environment, it is not necessary to provide a limiting device between the male connector and the female connector to restrict their movements relative to each other. Embodiments shown in FIG. 1A-10B are suitable for the first application environment. In the second application environment, the male connector 101 and the female connector 102 are respectively connected to the first component and the second component via hoses, or the first component and the second component can still move relative to each other after being connected to each other via the connector assembly. In the second application environment, it is necessary to provide a limiting device between the male connector 101 and the female connector 102, such that when the male connector and the female connector are installed in place, the male connector and the female connector cannot move relative to each other, and the connector assembly 100 can remain in the working position.

Figure 11:
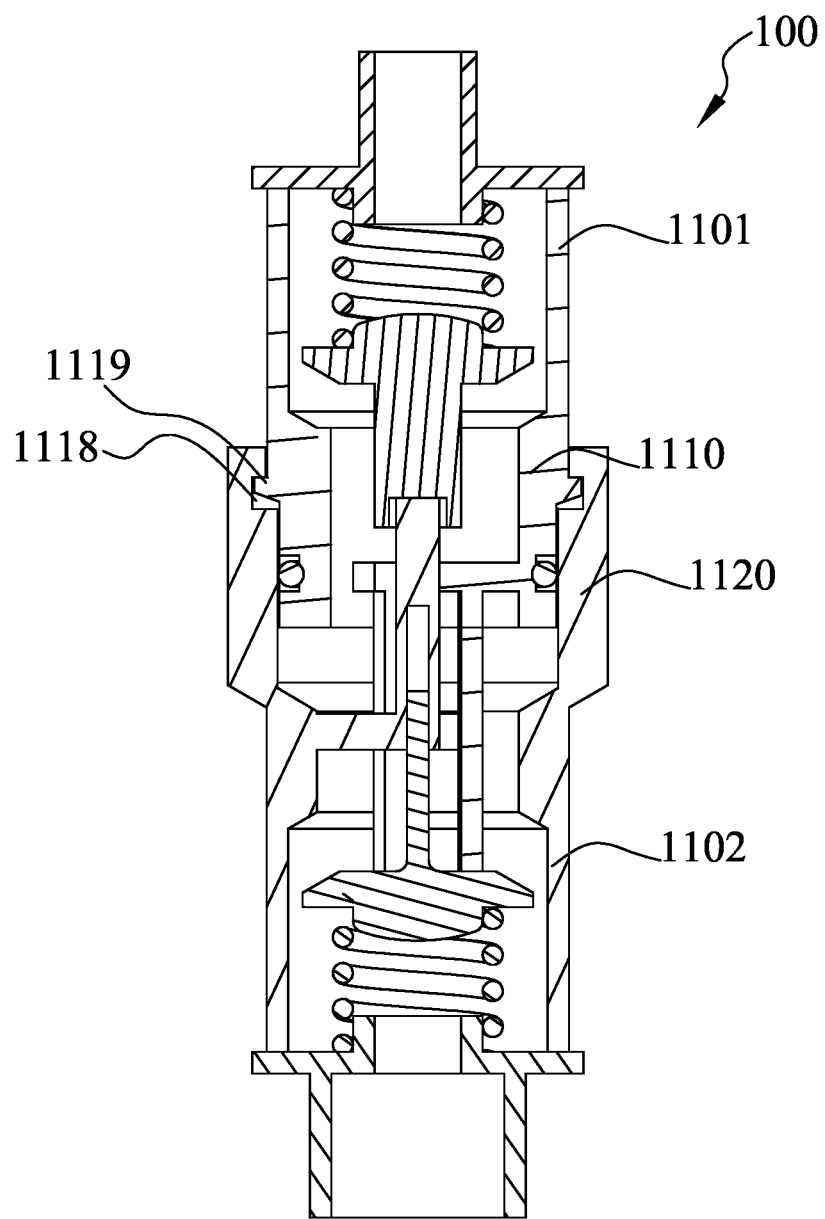
FIG. 11 is an axial cross-sectional view of a connector assembly according to another embodiment of the present disclosure.

FIG. 11 is an axial cross-sectional view of another embodiment of a connector assembly 1100 according to the present disclosure. The connector assembly 1100 according to this embodiment is suitable for the second application environment. The embodiment shown in FIG. 11 is similar to the embodiment shown in FIG. 1A. The difference is that in the embodiment shown in FIG. 11, an outer surface of an insertion end 1110 has an inwardly-recessed limiting recessed portion 1118, and an inner surface of the receiving end 1120 has an outwardly-protruding limiting protrusion 1119. When the male connector 1101 is inserted into the female connector 1102 and reaches the working position of the connector assembly 1100, the limiting protrusion 1119 enters the limiting recessed portion 1118. Therefore, when the male connector 1101 and the female connector 1102 are installed in place, the male connector 1101 and the female connector 1102 cannot move relative to each other, and the connector assembly 1100 can remain in the working position. FIG. 11 is an example of a connector assembly with a limiting structure. The limiting structure may also be in another form, for example, a clamp is disposed on the outside of the male connector and the female connector, as long as it can be ensured that the male connector and the female connector can remain in the working position of the connector assembly.

In an embodiment of the present disclosure, the lengths of the male connector push rod 209 and the female connector push rod 709 are configured such that when the male connector 101 and the female connector 102 reach the pre-installation position as shown in FIG. 10B, the male connector push rod 209 and the female connector push rod 709 come into contact with the female connector valve core 603 and the male connector valve core 203 respectively. This enables the female connector valve core 603 and the male connector valve core 203 to move simultaneously to open the male connector fluid passage 305 and the female connector fluid passage 705 when an external force is applied. In addition, the connector assembly according to the present disclosure is also configured such that when in the working position as shown in FIG. 10C, there is a certain distance between the female connector valve core 603 and the female connector cover portion 614 and there is a certain distance between the male connector valve core 203 and the male connector cover portion 214, such that there is a relatively large circulation space between the female connector valve core 603 and the female connector cover portion 614, there is a relatively large circulation space between the male connector valve core 203 and the male connector cover portion 214, and thus when the fluid flows through the male connector 101 and the female connector 102, the resistance is in a relatively small range.

In an application of the present disclosure, the male connector 101 is connected to a vehicle body of a vehicle, and communicates with a coolant in the vehicle body. The female connector 102 is connected to a battery for the vehicle, and is connected to a coolant in the battery. When it is necessary to install the battery on the vehicle body, the male connector 101 is connected to the female connector 102 to make them in the working positions, then the coolant in the vehicle body fluidly communicates with the coolant in the battery, and the coolant forms a closed circulation system to continuously cool the battery. When the battery is removed from the vehicle body, the male connector 101 and the female connector 102 are disconnected respectively, and the coolant will not leak into the external environment.

The male connector 101 and the female connector 102 in the present disclosure may only comprise corresponding housings, push rods, valve cores, and elastic devices, so the connector assembly has a simple structure and fewer components, and is easy to machine and manufacture. The male connector push rod 209 according to the present disclosure is integrated on the male connector housing 201 and forms an integral component with the male connector 101, and the female connector push rod 709 is integrated on the female connector housing 601 and forms an integral component with the female connector housing 601. This further reduces the number of components of the connector assembly, can reduce the assembly steps in the manufacturing process of the connector assembly, and improves the assembly efficiency. The male connector valve core 203 in the present disclosure has a recessed portion 415, which is configured to partially accommodate the female connector push rod 709, so as to limit the relative position of the male connector valve core 203 during movement. The female connector push rod 709 has a groove 797, which is configured to partially accommodate the female connector valve core 603, so as to limit the relative position of the female connector valve core 603 during movement. In this way, during the connection and disconnection operations of the connector assembly, the male connector valve core 203 and the female connector valve core 603 are respectively restricted by the female connector push rod 709 and can only move in the axial direction, so that the male connector valve core 203 and the female connector valve core 603 do not deviate easily during the movement, so as to ensure the engaging between the slope surface for sealing and the slope surface for engaging.

In addition, in the present disclosure, the male connector 101 and the female connector 102 are sealed by the interaction between the slope surfaces for engaging on the male connector housing/the female connector housing and the slope surfaces for sealing, and the engaging between the slope surfaces is very tight, so that the sealing effect is good. Specifically, the slope surfaces for sealing 412 and 812 of the male connector 101 and the female connector 102 are formed by the male connector valve core 203 and the female connector valve core 603, respectively, and the slope surfaces for engaging 341 and 741 are formed by the inner walls of the male connector housing 201 and the female connector housing 601, respectively. The male connector valve core 203 is subjected to thrust force exerted by the male connector elastic device 207, the slope surface for sealing 412 is tapered in the thrust force direction (that is, gradually approaching the axis), and the slope surface for engaging 341 and the slope surface for sealing 412 match in shape, so that the slope surface for sealing 412 is pressed against the slope surface for engaging 341. Similarly, the female connector valve core 603 is subjected to thrust force exerted by the female connector elastic device 607, the slope surface for sealing 812 is tapered in the thrust force direction (that is, gradually approaching the axis), and the slope surface for engaging 741 and the slope surface for sealing 812 match in shape, so that the slope surface for sealing 812 is pressed against the slope surface for engaging 741. Through the above arrangement, the male connector valve core 203 and the female connector valve core 603 provide a good sealing for the male connector 101 and the female connector 102 by using a simple structure.

Although only some features of the present disclosure are illustrated and described herein, those skilled in the art may make various improvements and changes. Therefore, it should be understood that the appended claims are intended to encompass all the above improvements and changes that fall within the substantial spirit and scope of the present invention.

The invention claimed is:

1. A connector assembly, comprising:
  a male connector including a male connector housing, a male connector valve core, and a male connector push rod, the male connector housing is internally provided with a male connector fluid passage and comprises an insertion end, the male connector valve core is movably disposed in the male connector fluid passage, and the male connector push rod is connected to the male connector housing; and
  a female connector including a female connector housing, a female connector valve core, and a female connector push rod, the female connector housing is internally provided with a female connector fluid passage and comprises a receiving end, the female connector valve core is movably disposed in the female connector fluid passage, and the female connector push rod is connected to the female connector housing and comprises a groove that is configured to at least partially receive a pin portion of the female connector valve core,
  wherein the insertion end of the male connector is capable of being inserted into the receiving end of the female connector, the male connector push rod is capable of being inserted into the female connector housing from the receiving end of the female connector to push the female connector valve core, and the female connector push rod is capable of being inserted into the male connector housing from the insertion end of the male connector to push the male connector valve core.

2. The connector assembly according to claim 1, wherein the male connector push rod extends out of the insertion end of the male connector, and the female connector push rod is at least partially accommodated in the female connector housing.

3. The connector assembly according to claim 1, wherein the male connector valve core has a closed position; when the male connector valve core is in the closed position, the male connector fluid passage is closed, and when the male connector valve core leaves the closed position, the male connector fluid passage is opened;
  the female connector valve core has a closed position; when the female connector valve core is in the closed position, the female connector fluid passage is closed, and when the female connector valve core leaves the closed position, the female connector fluid passage is opened; and
  when the insertion end of the male connector is inserted to a proper position in the receiving end of the female connector, the male connector push rod pushes the female connector valve core away from the closed position, so as to open the female connector fluid passage, and the female connector push rod pushes the male connector valve core away from the closed position, so as to open the male connector fluid passage, so that the male connector fluidly communicates with the female connector.

4. The connector assembly according to claim 3, wherein the male connector further comprises a male connector elastic device, the male connector elastic device is disposed between the male connector valve core and the male connector housing, and the male connector elastic device is configured to provide an elastic force to the male connector valve core such that the male connector valve core is capable of reaching the closed position; and
  the female connector further comprises a female connector elastic device, the female connector elastic device is disposed between the female connector valve core and the female connector housing, and the female connector elastic device is configured to provide an elastic force to the female connector valve core such that the female connector valve core is capable of reaching the closed position.

5. The connector assembly according to claim 1, wherein the male connector valve core has a slope surface for sealing, and an inner wall of the male connector housing is provided with a slope surface for engaging that engages with the slope surface for sealing; and
  the female connector valve core has a slope surface for sealing, and an inner wall of the female connector housing is provided with a slope surface for engaging that engages with the slope surface for sealing.

6. The connector assembly according to claim 1, wherein the male connector push rod and the male connector housing are integrally formed, and the female connector push rod and the female connector housing are integrally formed.

7. The connector assembly according to claim 1, wherein the male connector push rod comprises a first supporting portion and a first rod portion, the first supporting portion is connected to an inner wall of the male connector housing, and the first rod portion extends from the first supporting portion in an axial direction of the male connector; and
the female connector push rod comprises a second supporting portion and a second rod portion, the second supporting portion is connected to an inner wall of the female connector housing, and the second rod portion extends from the second supporting portion in an axial direction of the female connector;
wherein the first rod portion and the second rod portion are arranged in a staggered manner in a radial direction of the connector assembly.

8. The connector assembly according to claim 7, wherein the first supporting portion has a male connector hole, and the male connector hole is configured to allow the female connector push rod to pass through; and
the female connector has a female connector hole penetrating the second supporting portion in the axial direction, and the female connector hole is configured to allow the male connector push rod to pass through.

9. The connector assembly according to claim 8, wherein the male connector push rod comprises at least two first rod portions, and the at least two first rod portions are uniformly distributed around the male connector hole.

10. The connector assembly according to claim 1, wherein the male connector valve core comprises a recessed portion formed by recessing inward from a surface at a distal end of the male connector valve core, and the recessed portion is configured to match a shape of a distal end of the female connector push rod, so as to be capable of accommodating the distal end of the female connector push rod.

11. The connector assembly according to claim 1, wherein the pin portion is movable in the groove.

12. A connector assembly, comprising:
a male connector including a male connector housing, a male connector valve core, and a male connector push rod, the male connector housing is internally provided with a male connector fluid passage and comprises an insertion end, the male connector valve core is movably disposed in the male connector fluid passage, and the male connector push rod is integrally formed with the male connector housing; and
a female connector including a female connector housing, a female connector valve core, and a female connector push rod integrally formed with the female connector housing, the female connector housing is internally provided with a female connector fluid passage and comprises a receiving end, the female connector valve core is movably disposed in the female connector fluid passage, and the female connector push rod is integrally formed with the female connector housing,
wherein the insertion end of the male connector is capable of being inserted into the receiving end of the female connector, the male connector push rod is capable of being inserted into the female connector housing from the receiving end of the female connector to push the female connector valve core, and the female connector push rod is capable of being inserted into the male connector housing from the insertion end of the male connector to push the male connector valve core.

13. The connector assembly of claim 12, wherein an inner wall of the female connector housing and the female connector push rod define a female connector hole and the male connector push rod is configured to pass through the female connector hole when the insertion end of the male connector is inserted into the receiving end of the female connector.

14. The connector assembly of claim 12, wherein the male connector push rod includes a male connector supporting portion and a male connector rod portion extending from the male connector supporting portion to extend beyond the insertion end of the male connector; and
the male connector supporting portion defines a male connector hole and the female connector push rod is configured to pass through the male connector hole when the insertion end of the male connector is inserted into the receiving end of the female connector.

15. The connector assembly of claim 14, wherein the male connector rod portion includes a plurality of first rod portions that are circumferentially spaced about the male connector hole.

16. A connector assembly, comprising:
a male connector including a male connector housing, a male connector valve core, and a male connector push rod, the male connector housing is internally provided with a male connector fluid passage and comprises an insertion end, the male connector valve core is movably disposed in the male connector fluid passage and includes a recessed portion formed by recessing inward from a surface at a distal end of the male connector push rod, and the male connector push rod is connected to the male connector housing; and
a female connector including a female connector housing, a female connector valve core, and a female connector push rod, the female connector housing is internally provided with a female connector fluid passage and comprises a receiving end, the female connector valve core is movably disposed in the female connector fluid passage, and the female connector push rod is connected to the female connector housing,
wherein the insertion end of the male connector is capable of being inserted into the receiving end of the female connector, the male connector push rod is capable of being inserted into the female connector housing from the receiving end of the female connector to push the female connector valve core, and the female connector push rod is capable of being inserted into the male connector housing from the insertion end of the male connector to be received within the recessed portion of the male connector valve core to push the male connector valve core.

17. The connector assembly of claim 16, wherein the recessed portion of the male connector valve core is configured to match a shape of a distal end of the female connector push rod and the female connector push rod contacts a bottom of the recessed portion when the female connector push rod is inserted into the male connector housing from the insertion end of the male connector.

18. The connector assembly of claim 16, wherein the male connector valve core includes a head and a body extending from the head, the body defining a proximal end that is connected to the head and a distal end defines the recessed portion.

19. The connector assembly of claim 16, wherein the female connector valve core includes a head and a pin extending from the head.

20. The connector assembly of claim 19, wherein the male connector push rod contacts the head of the female connector valve core when the female connector push rod is inserted into the male connector housing from the insertion end of the male connector.

\* \* \* \* \*